Sept. 27, 1932.  R. NEILER ET AL  1,879,761
DISPLAY DEVICE
Filed Nov. 16, 1931
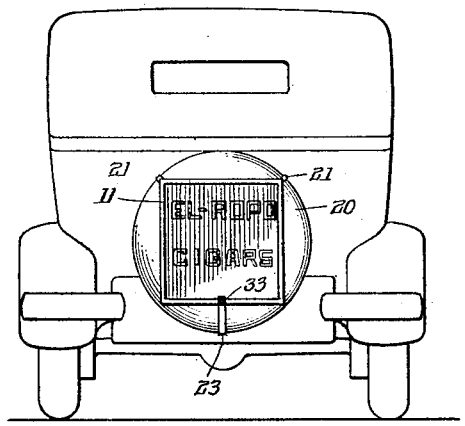
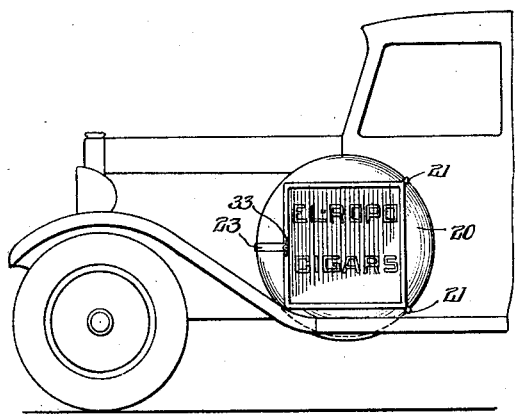
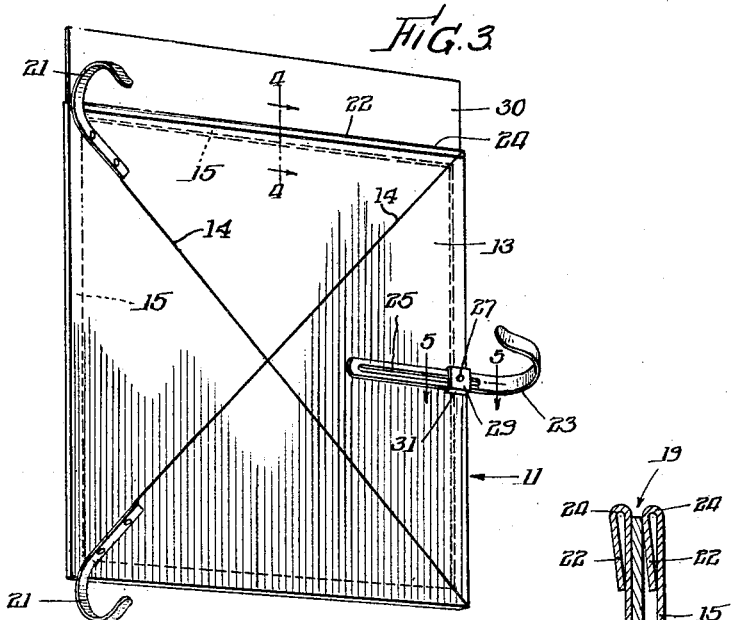
Inventors:
Richard Neiler,
William W. Holman,
By: Cheever, Cox & Moore Attys.

Patented Sept. 27, 1932

1,879,761

UNITED STATES PATENT OFFICE

RICHARD NEILER AND WILLIAM W. HOLMAN, OF CHICAGO, ILLINOIS

DISPLAY DEVICE

Application filed November 16, 1931. Serial No. 575,270.

Our invention relates in general to display devices and has more particular reference to a carrier for supporting sign cards or similar advertising media and the invention more especially resides in providing improved means whereby advertising may be conveniently displayed from the spare tires carried by taxicabs, buses, trucks and other automotive vehicles.

An important object of the present invention is to provide a card carrier adapted for demountable assembly on an automobile spare tire.

Another important feature resides in the particular construction whereby the carrier may be fastened to an automobile spare tire in a manner permitting removal of the card carrier readily from mounted position.

Still another object of the invention resides in providing means to mount the carrier on the spare tire, which means also cooperates with the card in the carrier to secure the same therein.

Other objects and advantages of the invention will become apparent as the same is more fully understood from the following description, which, taken in connection with the accompanying drawing, discloses a preferred form of the invention.

Referring to the drawing:

Figure 1 is a rear elevation of an automobile showing a device embodying our present invention as applied to a spare tire carried at the rear of the automobile;

Figure 2 is a partial side elevation of an automobile illustrating the device as applied to an automobile spare tire carried in a side mounting;

Figure 3 is a perspective view of the card carrier taken from the rear;

Figures 4 and 5 are sections taken substantially along the lines 4—4 and 5—5 in Figure 3 to illustrate details of construction.

To illustrate our invention, we have shown on the drawing a card carrier adapted to removably receive an advertising or display card and to be removably mounted on a wheel tire such as the spare tire usually carried on automobile vehicles so that the automobile spare wheel may be conveniently employed for commercial advertising purposes.

The device of our present invention contemplates a device in which the advertising card is readily removable so that the advertising may be changed from time to time simply by exchanging cards in the holder, and which at the same time, provides a card holder which can be quickly and easily removed from the spare wheel to permit the same to be applied to the vehicle axle and used in the ordinary manner when the necessity arises, the carrier being as easily re-assembled on the car wheel which has been removed from active service on the axle.

The carrier of our present invention comprises a frame 11 preferably formed of sheet metal and comprising preferably a rectangular back plate 13, which may be distorted along diagonal lines 14 to strengthen the plate since the same, if made of relatively light stock in order not to increase the weight of the device unduly and extended over a substantial area, may have a tendency to buckle if not strengthened in this manner. The plate 13 is provided with flanges 15 at its edges, said flanges extending parallel and in spaced relationship with the plate 13 a distance slightly greater than the thickness of the card to be carried in the holder to provide pockets 17 between the flanges and the plate, in which to receive the edges of the cards.

In order to facilitate the introduction of the sign cards into the holder, the same is provided with a slot 19 along the base of one of the pockets 17, through which slot a card may be readily inserted edgewise into the holder. The slot 19 may, of course, be formed along any edge of the frame 11, but we prefer to form it on the top edge, or in either of the side edges. The edges 18 of the portions forming the flanges 15 may be folded under to form it in the top edge, or in either of the of the card holder and the edges 22, defining the slot 19, may be likewise folded to form beads 24.

In order to attach the carrier to the spare tire 20 of an automobile, the frame 11 is provided with means, preferably hooks, extending to and engaging the tire at a plurality of points in the circumference thereof.

These hooks preferably include a pair of members 21, fixed to the frame as by riveting, welding, or otherwise, one at each of two adjacent corners of the frame and an adjustable hook 23 which is carried by the frame and projects from the frame on a side opposite the other two hooks. The hooks 21 and 23 preferably comprise sheet metal strips suitably configured to form hooked portions, and the base of the hook 23 is provided with a slot 25. The frame also is provided with a perforation 35 formed at an edge thereof which preferably passes through the plate 13 and one of the card retaining flanges. These perforations provide a channel for receiving the shank of a bolt 27, the head 29 of which is provided with lateral flanges 31, the edges of which engage the rear surface of the plate 13 and receive therebetween the slotted base of the hook 23. The shank 27 of the bolt passes through the slot 25 of the hook 23 and the perforations 35 of the frame. The forward end of the bolt shank 27 projects from the slot surface of the lower flange 15 and receives a washer 37 and a thumb nut 33. A lock washer 39 also may be provided so that when the thumb nut is tightened the hook 23 will be securely clamped to the frame in any of its adjusted positions. The bolt 27, preferably, is not assembled through the perforations 35 until the sign card 30 has been inserted in the frame with an edge extending in the channel 17 formed by and between the edge of the plate 13 and the flange 15 so that when the bolt shank 27 is passed through the perforations 35, it will form a perforation 36 in the lower edge of the sign card 30 and itself operate to retain the card in place.

It is not absolutely essential that the bolt shank 27 form a perforation in the sign card 30 but the card will be retained in place in the holder 11 simply by the clamping effort exerted on the flange 15 and the lower edge of the plate 13 when the thumb nut 33 is tightened in order to secure the hook 23 in adjusted position.

The device is assembled on a spare tire simply by hanging the hooks 21 on one side of the spare tire 20, the thumb nut 33 being loosened to permit the hook 23 to be slid outwardly of the frame 11 sufficiently to pass around the opposite side of the tire, and then moving the hook 23 inwardly. The slotted base of the hook slides on the shank of the bolt between the flanges 31 of the head thereof until the hook 23 snugly engages the tire when the thumb nut 33 may be tightened to hold the hook firmly in adjusted position and to clamp the lower edge of the card in the flange 15. Obviously the carrier may be applied to the tire in any preferred position, as shown in Figures 1 and 2.

Among the important features of our present invention, which will be apparent from the foregoing description, is the provision of an extremely cheap, simple and yet sightly carrier for removable attachment on the spare tire of an automobile; the feature wherein the carrier may be quickly and easily removed from the spare tire simply by turning a thumb nut; the feature whereby the tightening of the thumb nut securely holds the sign card in the carrier thus eliminating the necessity of other holding means to complete the structure and render the device more expensive; and, in general, the features of novelty of construction and general utility whereby the hitherto waste spaces on commercial and other automobiles may be utilized for commercial advertising.

It is thought that the invention and numerous of its attendant advantages will be understood from the foregoing description and it is obvious that numerous changes may be made in the form, construction and arrangement of the several parts without departing from the spirit or scope of our invention or sacrificing any of its attendant advantages; the form herein described being a preferred embodiment for the purpose of illustrating our invention.

Having thus described our invention, what we claim as new and desire to secure by Letters Patent is as follows:

1. A display device comprising a frame forming a carrier adapted to receive and support an advertising card and means comprising hooks carried by the frame and adapted to embrace an automobile tire for the purpose of securing the carrier on the tire, one of the hooks being shiftably mounted on the frame in order to facilitate the application of the carrier to the tire, and means to clamp said shiftably mounted hook in any of its shifted positions, said clamping means being formed in the card carrier in position to clamp a portion of the card in the carrier to retain the same therein.

2. A display device comprising a card carrier and means to removably attach the card carrier on the spare tire of an automobile, said means comprising a member shiftable on the carrier and adapted to removably engage the spare tire to secure the carrier thereon and a clamp to secure the member in adjusted position on the carrier, said clamp cooperating with the carrier to secure a card therein.

3. A display device comprising a card carrier and means to removably attach the card carrier on the spare tire of an automobile, said means comprising a member shiftable on the carrier and adapted to removably engage the spare tire to secure the carrier thereon and a clamp to secure the member in adjusted position on the carrier, said clamp including a portion removably penetrating a card in the carrier to retain the same therein.

4. A display device comprising a card carrier and means to removably attach the card carrier on the spare tire of an automobile, said means comprising a hook adjustable on the card carrier and adapted to embrace the tire, and a clamp to secure the adjustable hook in adjusted position on the carrier, said clamp co-operating with the carrier to secure a card therein.

5. A display device comprising a card carrier and means to removably attach the card carrier on a support, said means comprising a member shiftable on the carrier and adapted to engage the support to secure the carrier thereon and clamping means to fasten the shiftable member in adjusted position on the carrier, said clamp co-operating with the carrier to secure a card therein.

In witness whereof, we have hereunder subscribed our names.

RICHARD NEILER.
WILLIAM W. HOLMAN.